(12) United States Patent
Xu et al.

(10) Patent No.: US 11,168,972 B2
(45) Date of Patent: Nov. 9, 2021

(54) DETECTION DEVICE

(71) Applicant: CITIC DICASTAL CO., LTD, Hebei (CN)

(72) Inventors: Zuo Xu, Hebei (CN); Bowen Xue, Hebei (CN); Hujun Wu, Hebei (CN); Jiandong Guo, Hebei (CN)

(73) Assignee: CITIC DICASTAL CO., LTD, Hebei (CN)

( * ) Notice: Subject to any disclaimer, the term of this patent is extended or adjusted under 35 U.S.C. 154(b) by 161 days.

(21) Appl. No.: 16/564,846

(22) Filed: Sep. 9, 2019

(65) Prior Publication Data

US 2020/0191545 A1 Jun. 18, 2020

(30) Foreign Application Priority Data

Dec. 18, 2018 (CN) .......................... 201811546849.3

(51) Int. Cl.
*G01B 5/252* (2006.01)

(52) U.S. Cl.
CPC .................................. *G01B 5/252* (2013.01)

(58) Field of Classification Search
CPC .......... G01B 5/252; G01M 13/00–045; G01M 15/00–14; B23P 19/02; B23P 19/027; B23Q 1/26; G01N 3/08–12
USPC ...................................................... 73/116.01
See application file for complete search history.

(56) References Cited

U.S. PATENT DOCUMENTS

| 7,197,837 B1* | 4/2007 | Blanford ................ G01B 5/003 33/555.1 |
| 2015/0273595 A1* | 10/2015 | Xue ....................... B23B 47/281 408/97 |

FOREIGN PATENT DOCUMENTS

| CN | 201483267 U | 5/2010 |
| CN | 104613855 A | 5/2015 |
| CN | 204388764 U | 6/2015 |
| CN | 204630510 U | 9/2015 |
| CN | 205403679 U | 7/2016 |
| CN | 106352756 A | 1/2017 |
| CN | 205981007 U | 2/2017 |
| CN | 209131574 U | 7/2019 |

OTHER PUBLICATIONS

English translation of CN205403679, published Jul. 27, 2016. (Year: 2016).*
English translation of CN106352756, published Jan. 25, 2017. (Year: 2017).*

* cited by examiner

*Primary Examiner* — Christina A Riddle
(74) *Attorney, Agent, or Firm* — Cooper Legal Group, LLC

(57) ABSTRACT

The present disclosure is to provide a detection device. The detection device is configured to measure the coaxiality of the three camshaft mounting holes of the valve chamber cover during usage; and meanwhile, the detection device has the characteristics of high measurement accuracy, simple structure, low production cost, and the like.

1 Claim, 1 Drawing Sheet

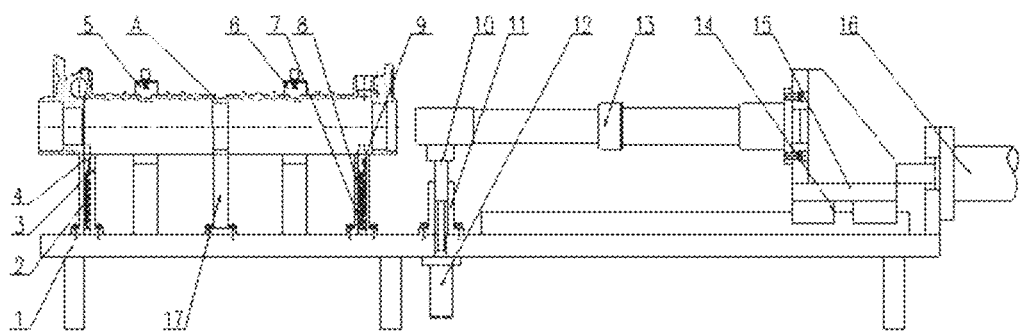

DETECTION DEVICE

CROSS REFERENCE TO RELATED APPLICATION

This application claims priority to the Chinese Patent Application No. 201811546849.3, entitled DETECTION DEVICE and filed on Dec. 18, 2018, which is incorporated herein by reference for all purposes.

FIELD OF THE INVENTION

The present disclosure relates to a detection device, and more particularly to a coaxiality detection device.

BACKGROUND OF THE INVENTION

A valve chamber cover is an important part of an automobile engine. The coaxiality of three camshaft mounting holes in the valve chamber cover need to be ensured in the machining process, and thus smooth mounting of camshafts can be ensured; and before the camshaft is assembled, it is necessary to detect the coaxiality of the camshaft mounting holes in the valve chamber cover, a three-coordinate measuring machine is adopted for detection according to a traditional detection method, although the method has high precision, the detection efficiency is quite low, and the actual production demands cannot be met. Therefore, a detection device capable of quickly detecting the coaxiality of the three camshaft mounting holes is needed.

SUMMARY OF THE INVENTION

The object of the present disclosure is to provide a detection device capable of measuring the coaxiality of three camshaft mounting holes of a valve chamber cover.

In order to achieve the object, according to the technical schemes, a detection device comprises a bottom plate, a left spring, a left sliding sleeve, a left positioning column, a left pressing cylinder, a right pressing cylinder, a right sliding sleeve, a right spring, a right positioning column, a supporting block, a guide sleeve, an air cylinder, an inspection tool body, a guide rail, a sliding plate, a servo electric cylinder and a supporting column, wherein the left sliding sleeve is fixed to an upper portion of the bottom plate on the left of the bottom plate; an outer side of the left positioning column is fitted with an inner hole of the left sliding sleeve; the left spring is mounted in the left sliding sleeve and arranged under the left positioning column; the right sliding sleeve is fixed to the upper portion of the bottom plate and arranged on the right of the left sliding sleeve; an outer side of the right positioning column is fitted with an inner hole of the right sliding sleeve; the right spring is mounted in the right sliding sleeve and arranged under the right positioning column; the left pressing cylinder and the right pressing cylinder are fixed to the upper portion of the bottom plate; the supporting column is fixed to the upper portion of the bottom plate and arranged between the left sliding sleeve and the right sliding sleeve; the guide sleeve is fixed to the upper portion of the bottom plate at the middle of the bottom plate; the supporting block is fitted with an inner hole of the guide sleeve at a lower portion of the supporting block; the air cylinder is fixed to a lower portion of the bottom plate; an output end of the air cylinder is connected with the lower portion of the supporting block, and an upper end of the supporting block contacts with the lower portion of the inspection tool body on the left of the inspection tool body; the sliding plate is mounted on the upper portion of the bottom plate through the guide rail; the inspection tool body is fixed to the left side of the sliding plate; the servo electric cylinder is fixed to the bottom plate on the right of the bottom plate, and an output end of the servo electric cylinder is connected with a right side of the sliding plate.

In the operation process, a left positioning column and a right positioning column penetrate through two positioning holes in a workpiece correspondingly, and the workpiece is pressed downwards, so that a workpiece positioning surface simultaneously makes contact with the upper end surfaces of a left sliding sleeve, a right sliding sleeve and a supporting column, the workpiece is pressed tightly through a left pressing cylinder and a right pressing cylinder, and the workpiece is completely positioned; an air cylinder drives a supporting block to move downwards, so that the upper end surface of the supporting block is separated from an inspection tool body; a servo electric cylinder enables the inspection tool body to move leftwards through a guide rail; and if the inspection tool body can be completely inserted into the three holes of the workpiece, the coaxiality of the three holes meets the requirement, and if the inspection tool body cannot be completely inserted into the three holes of the workpiece, the coaxiality of the three measured holes does not meet the requirement.

The detection device can measure the coaxiality of the three camshaft mounting holes of the valve chamber cover during usage; and meanwhile, the detection device has the characteristics of high measurement accuracy, simple structure, low production cost, and the like.

BRIEF DESCRIPTION OF THE DRAWINGS

FIG. 1 is a front view of a detection device according to the present disclosure.

Wherein, 1—a bottom plate, 2—a left spring, 3—a left sliding sleeve, 4—a left positioning column, 5—a left pressing cylinder, 6—a right pressing cylinder, 7—a right sliding sleeve, 8—a right spring, 9—a right positioning column, 10—a supporting block, 11—a guide sleeve, 12—an air cylinder, 13—an inspection tool body, 14—a guide rail, 15—a sliding plate, 16—a servo electric cylinder, 17—a supporting column, and A—workpiece.

DETAILED DESCRIPTION OF EMBODIMENTS

The details and operation conditions of a specific device according to the present disclosure will be described below with reference to the drawings.

The device comprises a bottom plate 1, a left spring 2, a left sliding sleeve 3, a left positioning column 4, a left pressing cylinder 5, a right pressing cylinder 6, a right sliding sleeve 7, a right spring 8, a right positioning column 9, a supporting block 10, a guide sleeve 11, an air cylinder 12, an inspection tool body 13, a guide rail 14, a sliding plate 15, a servo electric cylinder 16 and a supporting column 17. The left sliding sleeve 3 is fixed to the upper portion of the bottom plate 1 on the left of the bottom plate 1; an outer side of the left positioning column 4 is fitted with an inner hole of the left sliding sleeve 3; the left spring 2 is mounted in the left sliding sleeve 3 and arranged under the left positioning column 4; the right sliding sleeve 7 is fixed to the upper portion of the bottom plate 1 and arranged on the right of the left sliding sleeve 3; an outer side of the right positioning column 9 is fitted with an inner hole of the right sliding sleeve 7; the right spring 8 is mounted in the right sliding sleeve 7 and arranged under the right positioning column 9;

the left pressing cylinder 5 and the right pressing cylinder 6 are fixed to the upper portion of the bottom plate 1; the supporting column 17 is fixed to the upper portion of the bottom plate 1 and arranged between the left sliding sleeve 3 and the right sliding sleeve 7; the guide sleeve 11 is fixed to the upper portion of the bottom plate 1 at the middle of the bottom plate 1; the supporting block 10 is fitted with an inner hole of the guide sleeve 11 at a lower portion of the supporting block 10; the air cylinder 12 is fixed to a lower portion of the bottom plate 1; an output end of the air cylinder 12 is connected with the lower portion of the supporting block 10, and an upper end of the supporting block 10 contacts with the lower portion of the inspection tool body 13 on the left of the inspection tool body 13; the sliding plate 15 is mounted on the upper portion of the bottom plate 1 through the guide rail 14; the inspection tool body 13 is fixed to a left side of the sliding plate 15; the servo electric cylinder 16 is fixed to the bottom plate 1 on the right of the bottom plate 1, and an output end of the servo electric cylinder 16 is connected with a right side of the sliding plate 15.

In the operation process, the left positioning column 4 and the right positioning column 9 penetrate through two positioning holes in a workpiece correspondingly, and the workpiece is pressed downwards, so that a workpiece positioning surface simultaneously makes contact with the upper end surfaces of the left sliding sleeve 3, the right sliding sleeve 7 and the supporting column 17. The workpiece is pressed tightly through the left pressing cylinder 5 and the right pressing cylinder 6, and the workpiece is completely positioned; an air cylinder 12 drives the supporting block 10 to move downwards, so that the upper end surface of the supporting block 10 is separated from the inspection tool body 13; a servo electric cylinder 16 enables the inspection tool body 13 to move leftwards through the guide rail 14. If the inspection tool body 13 can be completely inserted into the three holes of the workpiece, the coaxiality of the three holes meets the requirement, and if the inspection tool body 13 cannot be completely inserted into the three holes of the workpiece, the coaxiality of the three measured holes does not meet the requirement.

The invention claimed is:

1. A detection device, comprising:
a bottom plate, a left spring, a left sliding sleeve, a left positioning column, a left pressing cylinder, a right pressing cylinder, a right sliding sleeve, a right spring, a right positioning column, a supporting block, a guide sleeve, an air cylinder, an inspection tool body, a guide rail, a sliding plate, a servo electric cylinder and a supporting column;
wherein the left sliding sleeve is fixed to an upper portion of the bottom plate on the left of the bottom plate;
wherein an outer side of the left positioning column is fitted with an inner hole of the left sliding sleeve;
wherein the left spring is mounted in the left sliding sleeve and arranged under the left positioning column;
wherein the right sliding sleeve is fixed to the upper portion of the bottom plate and arranged on the right of the left sliding sleeve;
wherein an outer side of the right positioning column is fitted with an inner hole of the right sliding sleeve;
wherein the right spring is mounted in the right sliding sleeve and arranged under the right positioning column;
wherein the left pressing cylinder and the right pressing cylinder are fixed to the upper portion of the bottom plate;
wherein the supporting column is fixed to the upper portion of the bottom plate and arranged between the left sliding sleeve and the right sliding sleeve;
wherein the guide sleeve is fixed to the upper portion of the bottom plate at a middle of the bottom plate; the supporting block is fitted with an inner hole of the guide sleeve at a lower portion of the supporting block;
wherein the air cylinder is fixed to a lower portion of the bottom plate, an output end of the air cylinder is connected with the lower portion of the supporting block, and an upper end of the supporting block contacts with the lower portion of the inspection tool body on the left of the inspection tool body;
wherein the sliding plate is mounted on the upper portion of the bottom plate through the guide rail;
wherein the inspection tool body is fixed to a left side of the sliding plate; and
wherein the servo electric cylinder is fixed to the bottom plate on the right of the bottom plate, and an output end of the servo electric cylinder is connected with a right side of the sliding plate.

* * * * *